US006958884B1

(12) United States Patent
Ojeda et al.

(10) Patent No.: US 6,958,884 B1
(45) Date of Patent: Oct. 25, 2005

(54) DISK DRIVE HAVING AN ACOUSTIC DAMPING SHIELD ASSEMBLY WITH AN ACOUSTIC BARRIER LAYER

(75) Inventors: Valentin Ojeda, Watsonville, CA (US); David Ali, San Jose, CA (US); Keith R. Berding, San Jose, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 109 days.

(21) Appl. No.: 10/448,488

(22) Filed: May 30, 2003

(51) Int. Cl.[7] .............................................. G11B 33/08
(52) U.S. Cl. ................................ 360/97.02; 360/97.01; 720/651
(58) Field of Search ........................... 360/97.01, 97.02, 360/97.03; 720/650, 651

(56) References Cited

U.S. PATENT DOCUMENTS

| 5,235,482 | A |   | 8/1993  | Schmitz         |          |
|-----------|---|---|---------|-----------------|----------|
| 5,483,397 | A | * | 1/1996  | Gifford et al.  | 360/97.01 |
| 5,666,239 | A | * | 9/1997  | Pottebaum       | 360/97.03 |
| 5,757,580 | A | * | 5/1998  | Andress et al.  | 360/97.02 |
| 6,078,498 | A | * | 6/2000  | Eckerd et al.   | 361/685  |
| 6,177,173 | B1| * | 1/2001  | Nelson          | 428/137  |
| 6,288,866 | B1| * | 9/2001  | Butler et al.   | 360/97.01 |
| 6,411,463 | B1| * | 6/2002  | Janik et al.    | 360/97.01 |
| 6,469,864 | B2| * | 10/2002 | Kamezawa et al. | 360/97.01 |
| 6,498,700 | B2| * | 12/2002 | Takahashi et al.| 360/97.01 |
| 6,674,608 | B1| * | 1/2004  | Bernett         | 360/97.01 |
| 6,697,217 | B1| * | 2/2004  | Codilian        | 360/97.01 |
| 6,735,043 | B2| * | 5/2004  | Bernett et al.  | 360/97.01 |
| 2002/0141108 | A1 | * | 10/2002 | Daniel et al. | 360/97.01 |

FOREIGN PATENT DOCUMENTS

JP       2002260468 A  *  9/2002  .......... H01B 17/56

* cited by examiner

Primary Examiner—William J Klimowicz
(74) Attorney, Agent, or Firm—Ramin Mobarhan, Esq.

(57) ABSTRACT

A disk drive that includes a head disk assembly (HDA) comprising a base having a top base surface and a bottom base surface, and a top cover secured to the top base surface; a printed circuit board assembly (PCBA) in communication with the HDA and comprising a first PCBA surface and a second PCBA surface wherein the first PCBA surface faces the bottom base surface; and a bottom cover fastened to and substantially covering the bottom base surface. The invention further includes an acoustic damping shield assembly placed between the bottom cover and the second PCBA surface, wherein the acoustic damping shield assembly comprises first and second acoustic absorption layers having major surfaces; an acoustic barrier layer placed in between the major surfaces; and the major surfaces and the acoustic barrier layer are fixed in a stacked relationship.

20 Claims, 2 Drawing Sheets

DISK DRIVE HAVING AN ACOUSTIC DAMPING SHIELD ASSEMBLY WITH AN ACOUSTIC BARRIER LAYER

FIELD OF THE INVENTION

The present invention relates to disk drives. More particularly, this invention pertains to a disk drive including an acoustic damping shield assembly for damping of noise generated by the operation of the disk drive.

BACKGROUND OF THE INVENTION

Disk drives are commonly employed in workstations, personal computers, portables and other computer systems to store large amounts of data in a readily-available form. Typically, the primary components of a disk drive are a head disk assembly and a printed circuit board assembly which when fixed to one another form a functional unit that is then connected to a computer, such as by insertion into a bay of a host computer.

The head disk assembly includes a base and a cover which collectively house a head stack assembly and a data storage disk mounted on a spindle motor assembly for rotating said storage disk, and an actuator arrangement, driven by a voice coil motor, for advancing a read/write head. A flex circuit transmits data signals to and from the read/write head of the actuator.

The operation of a hard disk drive necessarily generates noise such as airborne and structure borne noises. For example, the electromagnetic spindle and the electro-mechanical voice coil motors drive the device with the spindle motor continually rotating the storage disk(s), and the voice coil motor selectively driving the actuator(s) to position the read/write heads. The motors transmit structural vibrations throughout the disk drive, for example the cover and the printed circuit board, creating audible noise of varying frequencies.

The presence of acoustic noise in an operating disk drive is undesirable. Users perceive loudness as an indication of lower quality. As such, acoustic characteristics may serve as a benchmark of product quality. Furthermore, the ever-increasing operational speed of computers mandates reductions in the data access time from disk drives, resulting in increases in the speed of spindle motor and the actuator which in turn intensifies the overall disk drive noise. In addition, disk drive customers present increasingly challenging acoustic requirements, forcing manufacturers to design disk drives characterized by reduced acoustic noise.

Currently, one form of reducing the noise associated with the operation of a disk drive is by use of damping materials. Typically, a layer of damping material, such as a foam material, is located in various regions of the disk drive, such as in between the printed circuit board and the head disk assembly to reduce the associated amplification of the noise by the printed circuit board. One example of the damping material is a layer of adhesive material inserted between the base assembly (of the head disk assembly) and the circuit board, as described in the U.S. Pat. No. 5,235,482 entitled "Magnetic disk drive incorporating a mechanically damped base", herein incorporated by reference. Although increasing the thickness of damping material could improve acoustic damping, disk drive form factor standards limit the thickness of damping materials which can be used.

Accordingly, what is needed is a noise-damping device that allows for dampening the noise generated by the operation of the disk drive while minimizing the need for increased thickness of the noise-damping device.

SUMMARY OF THE INVENTION

This invention can be regarded as a disk drive that includes a head disk assembly (HDA) comprising a base having a top base surface and a bottom base surface, and a top cover secured to the top base surface; a printed circuit board assembly (PCBA) in communication with the HDA and comprising a first PCBA surface and a second PCBA surface wherein the first PCBA surface faces the bottom base surface; and a bottom cover fastened to and substantially covering the bottom base surface. The invention further includes an acoustic damping shield assembly placed between the bottom cover and the second PCBA surface, wherein the acoustic damping shield assembly comprises first and second acoustic absorption layers having major surfaces; an acoustic barrier layer placed in between the major surfaces; and means for fixing the major faces and the acoustic barrier layer in a stacked relationship.

DETAILED DESCRIPTION OF THE INVENTION

Figure 1:
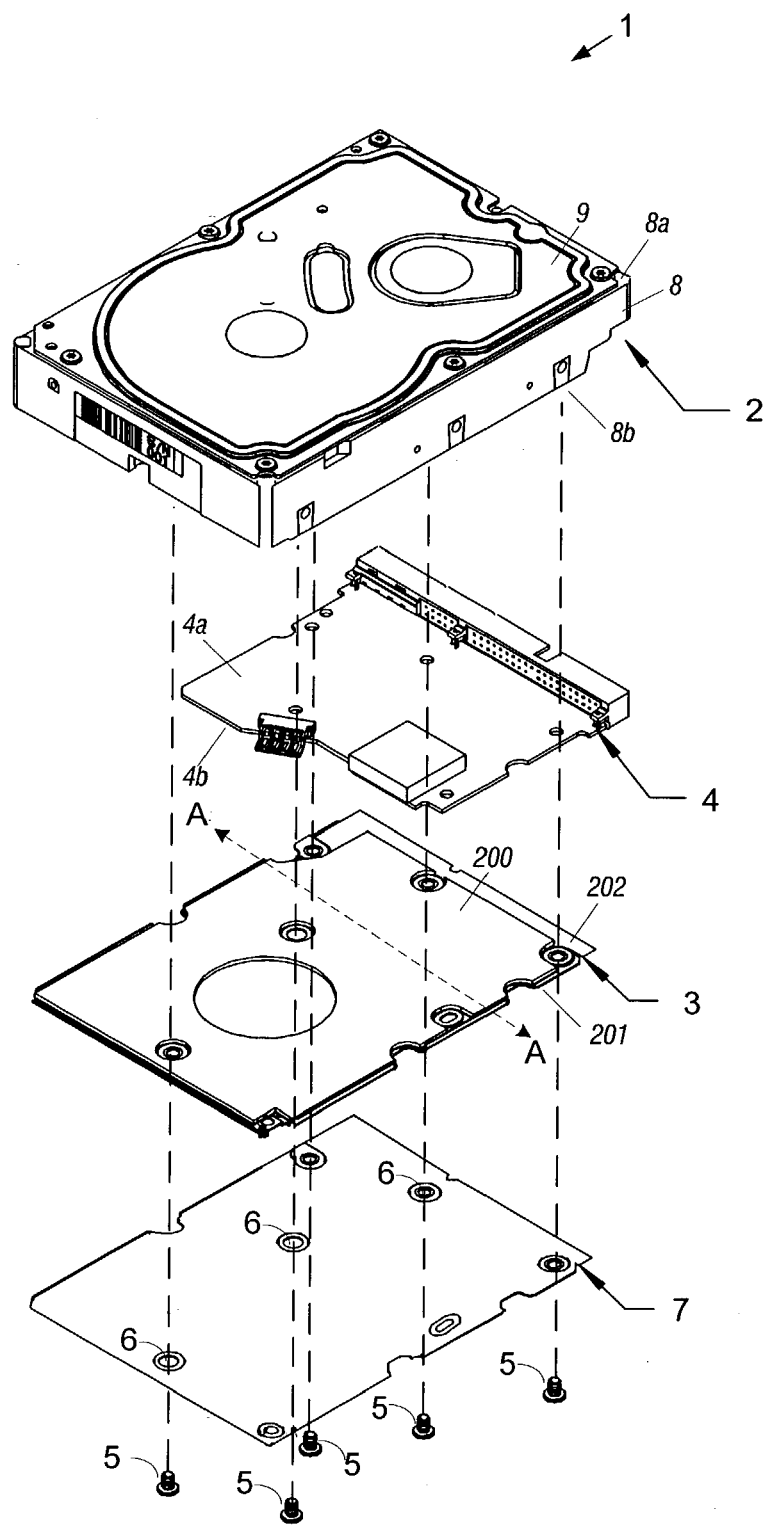
FIG. 1 is an exploded perspective view of a disk drive including a head disk assembly, a printed circuit board assembly, and an embodiment of an acoustic damping shield assembly of the present invention.

With reference to FIG. 1, a disk drive 1 according to an embodiment of the present invention includes a head disk assembly (HDA) 2 that is in communication with a printed circuit board assembly (PCBA) 4. The HDA 2 includes a base 8 having a top base surface 8a and a bottom base surface 8b and a top cover 9 secured to the top base surface 8a, suitably for forming a sealed chamber, which collectively house a head stack assembly (not shown), a spindle motor (not shown), and an actuator (not shown), both mounted on the base 8, and data storage disks (not shown), mounted on the spindle motor assembly for rotating the storage disks.

The disk drive further includes a printed circuit board assembly (PCBA) 4 in communication with the HDA 2 and comprising a first PCBA surface 4a and a second PCBA surface 4b wherein the first PCBA surface 4a faces the bottom base surface 8b. The disk drive 1 also includes a bottom cover 7 fastened to and substantially covering the bottom base surface 8b.

The disk drive 1 further includes an acoustic damping shield assembly 3 placed between the bottom cover 7 and the second PCBA surface 4b. The acoustic damping shield assembly 3 includes first and second acoustic absorption layers 200 and 201, respectively. The absorption layers 200 and 201 have major surfaces 200a and 201a (shown in FIG. 2A) in between which an acoustic barrier layer 202 is placed. The acoustic barrier layer 202 is of a denser composition than each of the first and second acoustic absorption layers 200 and 201 as described in greater detail in conjunction with FIG. 2A. Suitably, each of the major surfaces 200a and 201a and the acoustic barrier layer 202 are co-extensive with one another. The acoustic damping shield assembly 3 further includes means, such as adhesive, for fixing the major surfaces 200a and 201a and the acoustic barrier layer 3 in a stacked relationship as shown in FIG. 1. The acoustic damping shield assembly 3 further includes at least one opening 6 adapted to allow passage of a fastener, such as a screw 5, connecting the bottom cover 7 to at least one of the PCBA 4 and the HDA 2. Suitably, the acoustic damping shield assembly 3 is coextensive with the PCBA 4 and the bottom cover 7.

Figure 2A:
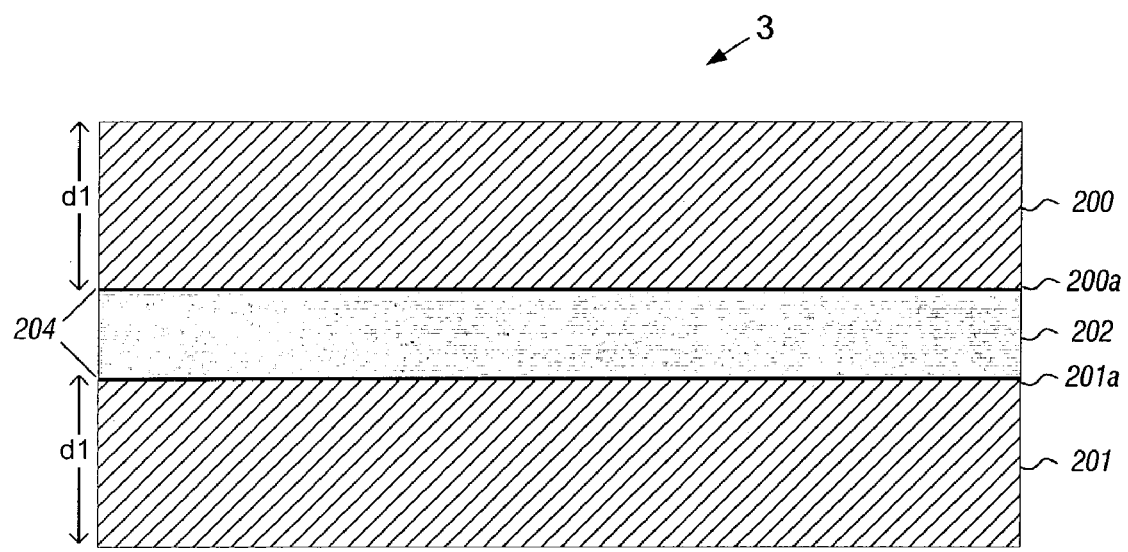
FIGS. 2A–B are cross-sectional views of one embodiment of the acoustic damping shield assembly of the present invention.

With reference to FIG. 2A, a cross-sectional view of the acoustic damping shield assembly 3, such as one taken at line A—A of FIG. 1 is shown. As shown in FIG. 2A, the acoustic damping shield assembly 3 includes the acoustic barrier layer 202 placed in between the absorption layers 200 and 201. The acoustic barrier layer 202 is of a denser composition than each of acoustic absorption layers 200 and 201. Suitably, the acoustic barrier layer 202 is of a consistent density and the acoustic absorption layers 200 and 201 are each of a substantially inconsistent density. In one embodiment of the present invention, the acoustic barrier layer 202 is of a metallic composition, such as stainless steel or an aluminum alloy. In another embodiment, the acoustic barrier layer 202 may be a plastic film, such as a polyester composition, an example of which is Mylar™. Suitably, the acoustic barrier layer 202 is characterized by a thickness of approximately 0.010 inches. In one embodiment of the present invention, the absorption layers 200 and 201 are each characterized by an unconstrained thickness d1, such as approximately 0.04 inches and may be suitably fabricated of a compressible foam composition such as of polyvinyl chloride foam composition, a polyethylene foam composition, a polyurethane foam or other foam materials providing comparable acoustic absorption benefits. Suitably, the absorption layers 200 and 201 are also fabricated of a composition of an open cell type, closed cell type, semi-open cell type or semi-closed cell type.

As further shown in FIG. 2A, the absorption layers 200 and 201 have major surfaces 200a and 200b, respectively, in between which the acoustic barrier layer 202 is placed. Suitably, each of the major surfaces 200a and 201a and the acoustic barrier layer 202 are co-extensive with one another. The acoustic damping shield assembly 3 further includes means 204, for fixing the major surfaces 200a and 201a and the acoustic barrier layer 3 in a stacked relationship. Suitably, the means 204 includes an adhesive, such as glue, applied to substantially cover the major surfaces 200a and 201a.

Figure 2B:
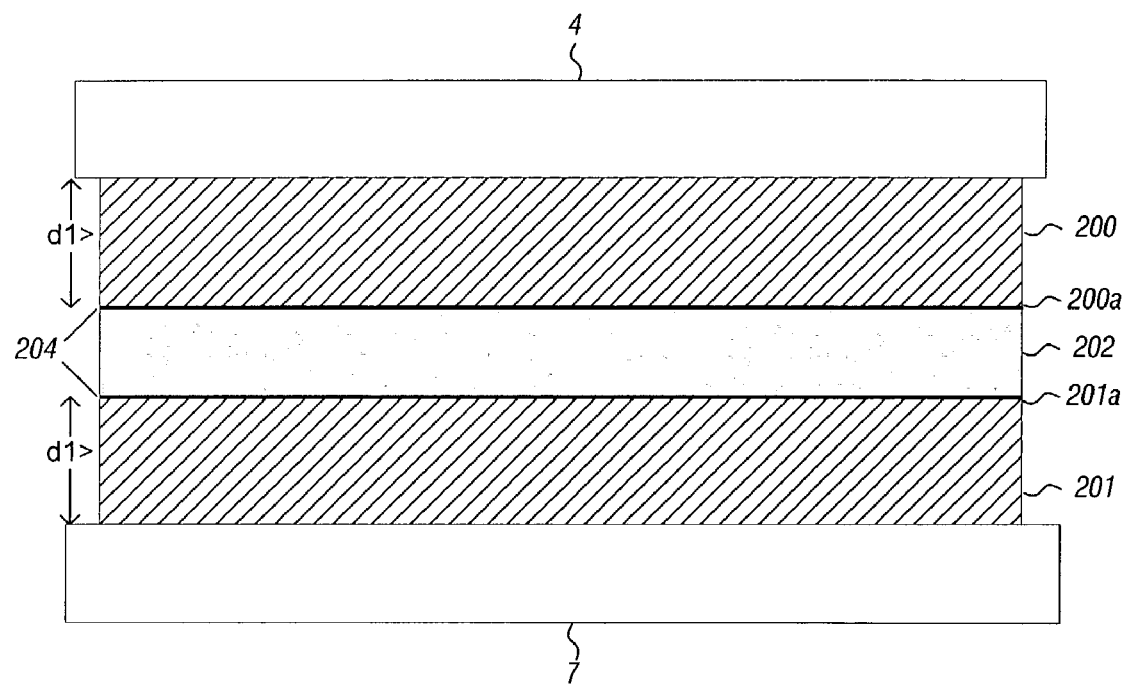

With reference to FIG. 2B, a cross-sectional view of an acoustic damping shield assembly 3, such as one taken at line A—A of FIG. 1 is shown, in which the disk drive 1 has been assembled by fixing the HDA 2, the PCBA 4, the acoustic damping shield assembly 3 and the bottom cover 7 into a stacked relationship. Suitably, fixing means such as screws 5 (shown in FIG. 1) extending from the bottom cover 7 and received in corresponding holes (not shown) in the HDA 2, are used to assemble disk drive 1. As shown in FIG. 2B, assembling disk drive 1 causes the compressible foam of the absorption layers 200 and 201 to be compressed to a thickness of less than d1, thus securing the acoustic damping shield assembly 3 in between the bottom cover 7 and the PCBA 4. Suitably, the compressed thickness is approximately 0.60(d1) for each of absorption layers 200 and 201. As shown, the acoustic damping shield assembly 3 is coextensive with the PCBA 4 and the bottom cover 7.

One advantage of the foregoing feature of the present invention over the prior art is that by placing an acoustic barrier layer 202 in between the less dense acoustic absorption layers 200 and 201 in a stacked relationship, the transmission of noise generated by the operation of the disk drive 1 across the acoustic damping shield assembly 3 can be further dampened while minimizing the need for increased thickness of the acoustic damping shield assembly 3.

What is claimed is:

1. A disk drive comprising:
   a) a head disk assembly (HDA) comprising
      a base having a top base surface and a bottom base surface; and
      a top cover secured to the top base surface;
   b) a printed circuit board assembly (PCBA) in communication with the HDA and comprising a first PCBA surface and a second PCBA surface wherein the first PCBA surface faces the bottom base surface;
   c) a bottom cover fastened to and substantially covering the bottom base surface; and
   d) an acoustic damping shield assembly placed between the bottom cover and the second PCBA surface, wherein the acoustic damping shield assembly comprises:
      first and second acoustic absorption layers having major surfaces;
      an acoustic barrier layer placed in between the major surfaces wherein the acoustic barrier layer is of a denser composition than each of the first and second acoustic absorption layers; and
      means for fixing the major surfaces and the acoustic barrier layer in a stacked relationship.

2. A disk drive as defined in claim 1, wherein the acoustic damping shield assembly is coextensive with the PCBA and the bottom cover.

3. A disk drive as defined in claim 1, wherein the acoustic barrier layer is of a consistent density and the acoustic absorption layers are each of a substantially inconsistent density.

4. A disk drive as defined in claim 1, wherein the acoustic barrier layer comprises a plastic film.

5. A disk drive as defined in claim 4, wherein the plastic film comprises a polyester composition.

6. A disk drive as defined in claim 1, wherein the acoustic barrier layer comprises a metallic composition.

7. A disk drive as defined in claim 6, wherein the metallic composition comprises at least one of a stainless steel and aluminum alloy.

8. A disk drive as defined in claim 1, wherein the acoustic barrier layer is characterized by a thickness of approximately 0.010 inches.

9. A disk drive as defined in claim 1, wherein the first and second acoustic absorption layers comprise a foam composition.

10. A disk drive as defined in claim 9, wherein the foam composition is a compressible foam.

11. A disk drive as defined in claim 10, wherein the compressible foam is characterized by an unconstrained thickness d1.

12. A disk drive as defined in claim 11, wherein the unconstrained thickness is approximately 0.04 inches.

13. A disk drive as defined in claim 10, wherein the compressible foam is compressed to a thickness less than d1.

14. A disk drive as defined in claim 13, wherein the compressed thickness is approximately 0.60(d1).

15. A disk drive as defined in claim 9, wherein the foam composition comprises at least one of an open cell type, a closed cell type, a semi-open cell type and a semi-closed cell type.

16. A disk drive as defined in claim 9, wherein the foam composition comprises at least one of a polyvinylchloride foam, a polyethylene foam and a polyurethane foam.

17. A disk drive as defined in claim 1, wherein each of the major surfaces and the acoustic barrier layer are coextensive with one another.

18. A disk drive as defined in claim 1, wherein the means for fixing the major surfaces and the acoustic barrier layer comprises an adhesive.

19. A disk drive as defined in claim 1, wherein the acoustic damping shield assembly comprises at least one opening adapted to allow passage of a fastener connecting the bottom cover to at least one of the PCBA and the HDA.

20. A disk drive as defined in claim 19, wherein the fastener is a screw.

* * * * *